(12) United States Patent
Lui et al.

(10) Patent No.: US 6,487,569 B1
(45) Date of Patent: Nov. 26, 2002

(54) METHOD AND APPARATUS FOR ORGANIZING NOTES ON A LIMITED RESOURCE COMPUTING DEVICE

(75) Inventors: Charlton E. Lui, Redmond, WA (US); Dan W. Altman, Kirkland, WA (US); Jossef Goldberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/226,034

(22) Filed: Jan. 5, 1999

(51) Int. Cl.[7] .............................................. G06F 15/00
(52) U.S. Cl. ........................ 707/530; 707/541; 345/582
(58) Field of Search .......................... 707/500.1, 501.1, 707/511, 514, 515, 530, 541; 345/781, 582

(56) References Cited

U.S. PATENT DOCUMENTS

| | | | | |
|---|---|---|---|---|
| 5,398,310 A | * | 3/1995 | Tchao et al. ................ | 707/451 |
| 5,559,942 A | * | 9/1996 | Gough et al. ................ | 395/155 |
| 5,563,996 A | * | 10/1996 | Tchao ........................ | 707/521 |
| 5,590,256 A | * | 12/1996 | Tchao et al. ................ | 707/525 |
| 5,596,700 A | * | 1/1997 | Darnell et al. ............... | 345/340 |
| 5,838,819 A | * | 11/1998 | Ruedisueli et al. .......... | 382/187 |
| 5,949,413 A | * | 9/1999 | Lerissa et al. .............. | 345/330 |
| 6,198,904 B1 | * | 3/2001 | Rosen ...................... | 434/307 R |

* cited by examiner

Primary Examiner—Joseph H. Feild
Assistant Examiner—Maikhanh Nguyen
(74) Attorney, Agent, or Firm—Christensen O'Connor Johnson Kindness PLLC

(57) ABSTRACT

A notes organizer program is provided that allows a user to organize notes on a limited resource computing device. The notes are organized by associating a note, if desired, with a project. The user can name or rename a note or a project. If the user does not specify a note name, the notes organizer program determines the note name based on the associated project. If there is no associated project, the note name is based on the type of note (e.g., voice, handwritten, etc.). A template project is provided for creating notes from templates.

31 Claims, 16 Drawing Sheets

METHOD AND APPARATUS FOR ORGANIZING NOTES ON A LIMITED RESOURCE COMPUTING DEVICE

FIELD OF THE INVENTION

This invention relates generally to computer systems, and more particularly to a method and system for organizing notes on a limited resource computing device.

BACKGROUND OF THE INVENTION

Small, mobile computing devices such as personal desktop assistants including hand-held and palm-type computers and the like are becoming increasingly popular for use by business people and others who must travel, and thus cannot readily access information stored on their desktop computer or office network workstation. Although laptop computers are capable of running virtually all of the application programs that execute on desktop machines, laptop computers are often either too large and/or too heavy to carry around. There is thus an increased demand for substantially smaller palm-type computers that are able to run business applications of less complexity than those designed to run on a desktop computer and enable a user to quickly access all types of personal and business related data, such as addresses, telephone numbers, scheduled appointment times, etc.

One such palm-type computer is Microsoft's Palm-size PC. A Palm-size PC includes a touch screen display. The user may input data by touching a stylus to a user interface that is displayed on the touch screen display. A Palm-size PC user interface touch screen display is similar in appearance to a Windows user interface displayed on a desktop or laptop PC. A taskbar, used for invoking application programs, is displayed at the bottom of the touch screen display of the Palm-size PC. The user interface displayed on the touch screen display also includes a virtual keyboard for entering data.

One of the main reasons that a user will use a palm-type computer is to create and store notes when he or she is away from his or her desktop computer. Notes can be created on the Palm-size PC using various methods, including: typing a note using a virtual keyboard; handwriting a note using a stylus; and recording a note using a built-in recorder. Because notes can become voluminous, a method for organizing such notes in a logical manner is desirable. The present invention is directed to logically organizing notes on a limited resource computing device, such as a palm-type computer.

SUMMARY OF THE INVENTION

The present invention is directed to a method, and system for organizing notes on a limited resource computing device, such as Microsoft's Palm-size PC, according to projects. A user interface is provided for creating a note. In response to a user requesting saving the note, the note is stored. If an active project exists when the note is stored, the note is associated with the active project.

In accordance with other aspects of the present invention, the user can create a project.

In accordance with further aspects of the present invention, the user can designate a project as an active project. A new note is associated with an active project, if an active project exists, when the note is saved.

In accordance with yet further aspects of the present invention, a note name is determined when a note is saved. The note name may be specified by the user or determined based on text found in the note. When based on text found in the note, the text of the note is analyzed (e.g., speech recognition or handwriting recognition is applied to the text) and the note name is determined based on the first line of valid text found in the note.

In accordance with still other aspects of the present invention, the note name may be a default note name. A default note name is a sequential note name based on the active project (e.g., PROJX1, PROJX2, etc.). If there is no active project, the default note name is a sequential file name based on the type of note (e.g., VOICE1, VOICE2, etc.).

In accordance with yet other aspects of the present invention, a notes index window is provided to display summary information for all notes, or for notes associated with a specific project. Preferably, the summary information contains fields for the note name, associated project, note type, memory location, note size, and note time. The notes can be displayed in ascending or descending order based on any field of the summary information.

In accordance with still further aspects of the present invention, a templates project is provided. The templates project is accessible from any other project. The templates project allows a user to create a note from an existing template.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4D is a flow diagram illustrating in detail the logic used to perform a template function;

DETAILED DESCRIPTION OF THE PREFERRED EMBODIMENT

Figure 1:
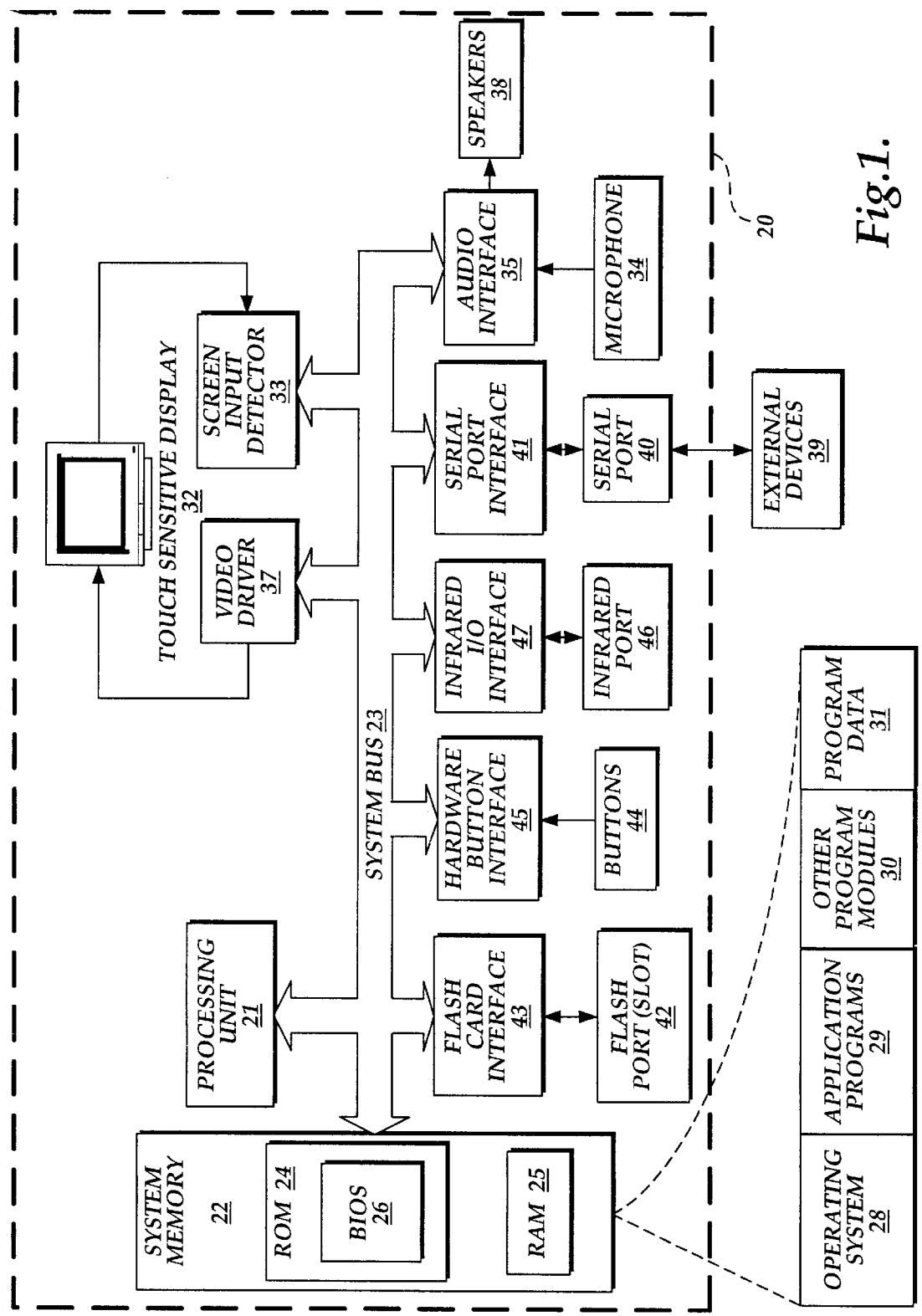
FIG. 1 is a block diagram of a hand-held personal computing device suitable for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a hand-held personal computing device such as a personal desktop assistant. Generally, program modules include routines, programs, objects, components, data structures and the like that perform particular tasks or implement particular abstract data types.

While those skilled in the art will appreciate that the invention is ideally suited for use with a hand-held personal computing device and is described in combination with such a device, it is to be understood that the invention can be practiced in other limited resource devices and systems, for example, mobile devices such as pagers and telephones.

FIG. 1 illustrates an exemplary system for implementing the invention. More specifically, FIG. 1 illustrates a general purpose computing device in the form of a hand-held personal computing device 20 that includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the hand-held personal computing device 20, such as during start-up, is stored in the ROM 24. The system may also include one or more removable flash memory cards (not shown) and/or PC memory cards (not shown).

A number of program modules are stored in the ROM 24 and/or RAM 25, including an operating system 28 (preferably, Windows CE), one or more application programs 29, other program modules 30 and program data 31. A user may enter commands and information into the hand-held personal computing device 20 through input devices such as a touch sensitive display 32 with suitable input detection circuitry 33. Other input devices may include a microphone 34 connected through a suitable audio interface 35 and a physical (hardware) keyboard (not shown). The output circuitry of the touch sensitive display 32 is also connected to the system bus 23 via a video driver 37. In addition to the display 32, the hand-held personal computing device 20 may include other peripheral output devices, such as at least one speaker 38 and printers (not shown).

Other external input or output devices 39 such as a joystick, game pad, satellite dish, scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). The hand-held personal computing device 20 may further include or be capable of connecting to a flash card memory (not shown) through an appropriate connection port (e.g., slot) 42 and interface 43. A number of hardware buttons 44 such as switches, buttons (e.g., for switching applications) and the like may be further provided to facilitate user operation of the hand-held personal computing device 20, and are also connected to the system via a suitable interface 45. An infrared port 46 and corresponding interface/driver 47 are provided to facilitate communication with other peripheral devices, including other computers, printers, and so on (not shown). It will be appreciated that the various components and connections shown are exemplary and other components and means of establishing communications links may be used.

The soft input panel architecture is primarily designed to enable character, key-based and other user data input via the touch sensitive display 32 using a stylus (not shown) of the hand-held personal computing device 20 rather than a physical keyboard (not shown). However, as can be appreciated, a given hand-held personal computing device 20 may optionally and additionally include a physical keyboard. As will become more apparent from the following description, the "soft input panel" need not be limited to a touch-sensitive panel arranged for directly receiving input, but may alternatively include other input devices such as the microphone 34. For example, spoken words may be received at the microphone 34, recognized, and displayed as text in an on-screen window.

Figure 2A:
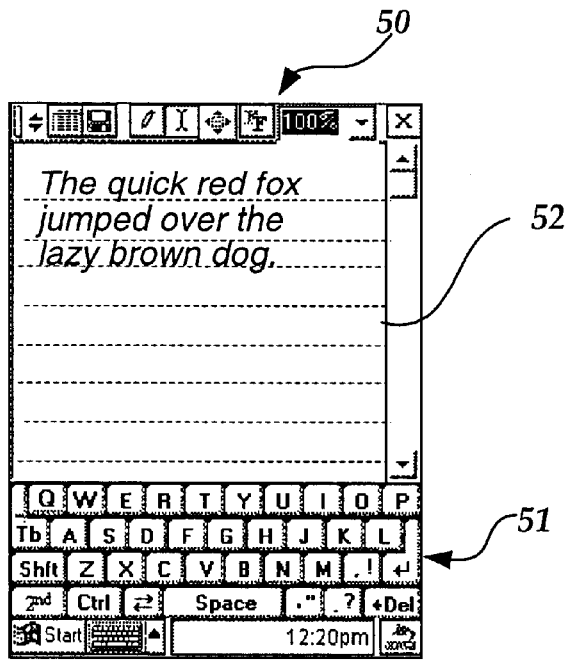
FIG. 2A illustrates an exemplary user interface for creating a note using a virtual keyboard on a hand-held personal computing device.
Figure 2B:
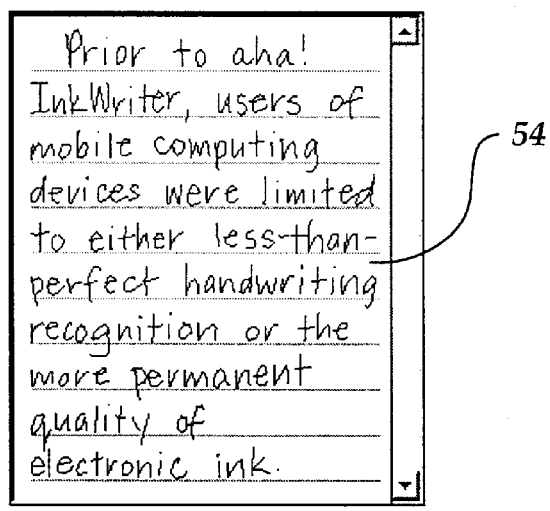
FIG. 2B illustrates an exemplary user interface for creating an ink note on a hand-held personal computing device.

A user can create a note on the hand-held personal computing device 20 by various methods, including: recording using a built-in recorder; inputting text using a virtual keyboard or an external hardware keyboard; or handwriting the note using a stylus. FIG. 2A illustrates an exemplary user interface for creating a note using a virtual keyboard 50. Using a stylus, the user inputs text 52 by causing the stylus to contact the keys of the virtual keyboard 51 displayed on the touch sensitive display 32 of the palm-type computing device 20. FIG. 2B illustrates an exemplary user interface for creating a handwritten, or ink note. The user handwrites text 54 onto the touch sensitive display 32 of the hand-held personal computing device 20 using a stylus.

The present invention provides a method of logically organizing notes on a hand-held computing device, such as Microsoft's Palm-size PC. The notes are organized by project. The project structure is similar to a directory structure. This structure not only allows notes to be logically organized, the structure also allows a user to easily transfer notes from a hand-held personal computing device to a laptop or desktop computer device in an organized manner.

Figure 2C:
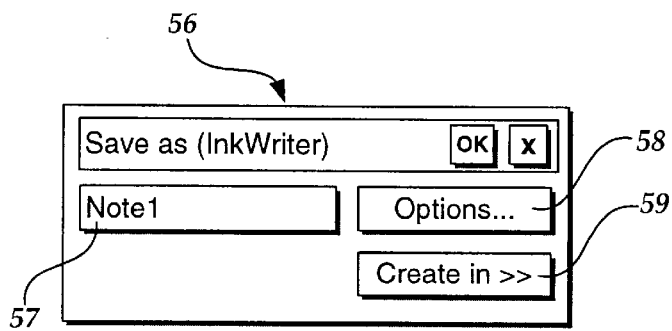
FIG. 2C illustrates an exemplary user interface for saving a note.

A user can save the note that he or she created. Preferably, a save, and/or save as, option is included on the user interface associated with any of the available note creation methods. FIG. 2C illustrates an exemplary Save as user interface 56 for saving a note. The Save as user interface 56 includes an edit box for the name of the note 57. Preferably, the user interface will display a default note name and the user can change the default note name, if desired. In a preferred embodiment, the default note name is based on the text of the note, if possible. If a note name cannot be determined based on the text of the note, a default note name is determined based on the active project, if there is one, or the type of the note (e.g., recording). The Save as user interface 56 illustrated in FIG. 2C includes an Options button 58, and a Create in button 59. The Create in button 59 extends the Save as user interface 56 in the manner illustrated in FIG. 2F, and described later. The Options button 58 causes the display of an Options user interface, illustrated in FIG. 2D, and described next.

Figure 2D:
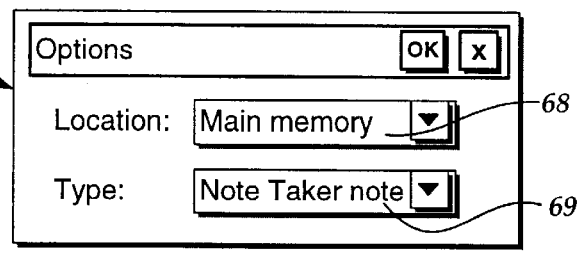
FIG. 2D illustrates an options user interface for the save not user interface of FIG. 2C.

The Options user interface 67 illustrated in FIG. 2D includes a Location list 68 that allows a user to select a location to save a note. More specifically, the Location list 68 allows a user to save the note in main memory or in any other installed non-volatile memory, such as a flash memory card or a PC memory card. Preferably, a project can exist in multiple locations (e.g., main memory and Compact Flash). The Options user interface 67 also includes a Type field 69. The Type field 69 is determined by the note type, for example, InkWriter Note, Text Note, etc., and cannot be modified by the user.

Figure 2E:
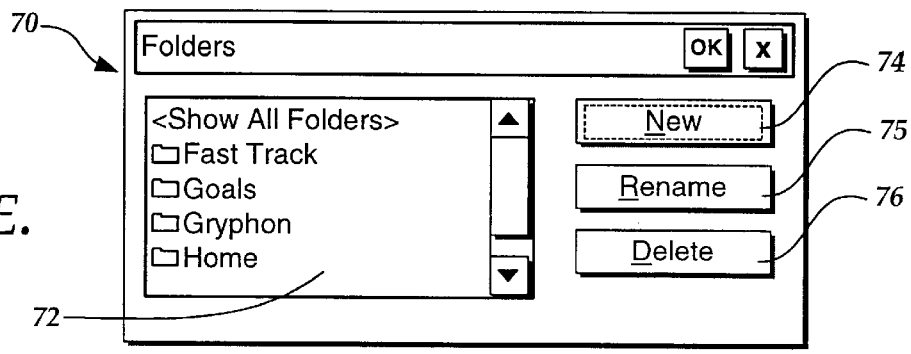
FIG. 2E illustrates an exemplary user interface for organizing and maintaining projects.

FIG. 2E illustrates a projects user interface, also known as the Folders user interface 70, for organizing and maintaining projects. The organization or structure for projects includes a top, or projects, directory. Each project is a folder stored in the projects directory. All notes associated with a given project are stored in the folder of the associated project. If a note is not associated with any project, it is stored in the top, or projects, directory. Project directories can be located in multiple removable file systems, such as compact Flash cards, as well as main memory. The Folders user interface 70 includes a list of all of the projects 72, where a user can select one of the projects. All projects appear in the projects list 72, regardless of the project's location (e.g., main memory, Flash card, etc.). If there are multiple notes with the same name for a given project, all notes will be listed. Preferably, notes not stored in main memory will be distinguishable from notes stored in main memory, for example, by displaying an asterisk next to the name of the note not stored in main memory. Preferably, the Folders user interface 70 will automatically update if any project directories are removed or added (e.g., by removing or adding a compact Flash card). A New button 74 is provided for creating a new project. A Rename button 75 is provided for changing the name of a selected project. A Delete button 76 allows the user to delete a selected project.

Figure 2F:
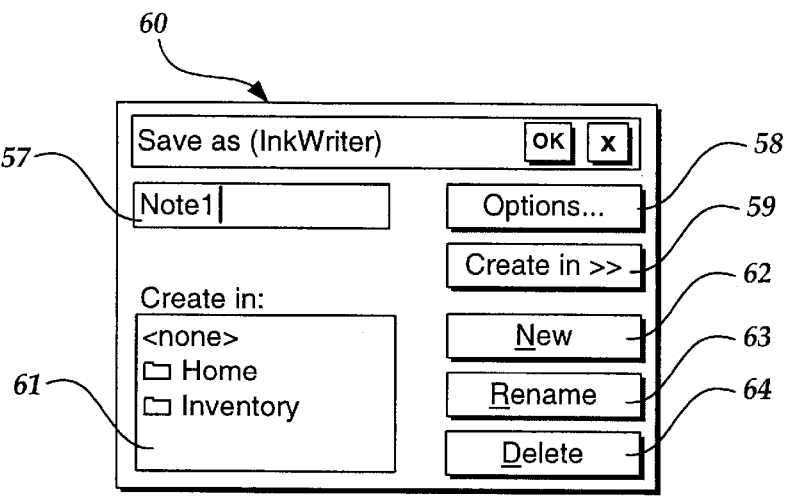
FIG. 2F illustrates an extended view of the save notes user interface of FIG. 2C.

FIG. 2F illustrates an extended view of the Save as user interface 60 illustrated in FIG. 2C. The extension to the user interface is similar to the Folders user interface 70 illustrated in FIG. 2E. A Create in list 61 displays all of the projects. Exactly one project (or<none>) must be selected from the list. A default project is selected when the user interface is initially displayed. The default project is the active project. If there is no active project, the default is set to <none>. If the selected project is none, the note will not be associated with any project, and will be stored in the top, or projects, directory. A New button 62 is provided for the user to create a new project. A Rename button 63 allows the user to change the name of the selected project. A Delete button 64 allows the user to delete a selected project.

Figure 2G:
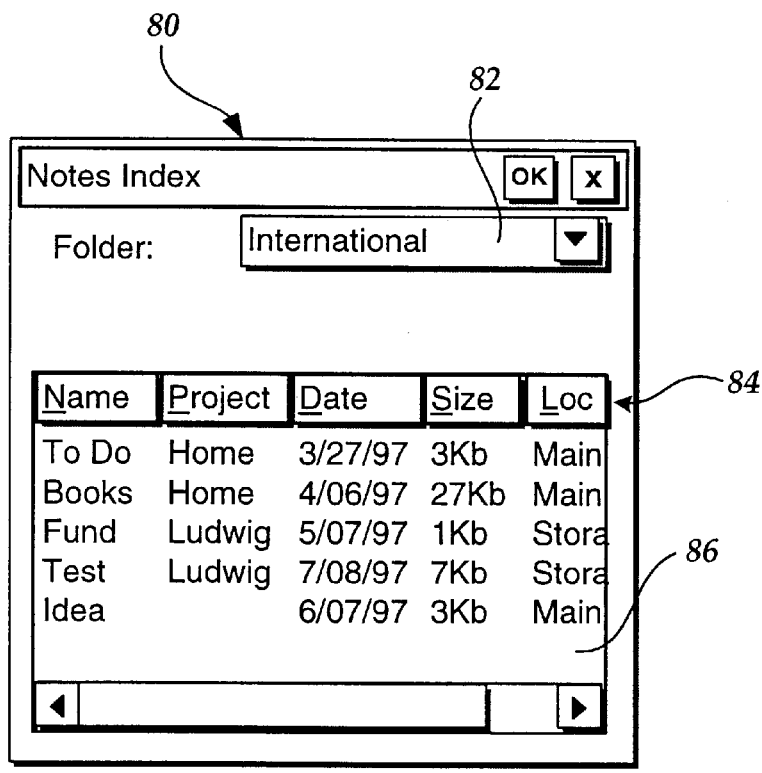
FIG. 2G illustrates an exemplary notes index window.
Figure 2H:
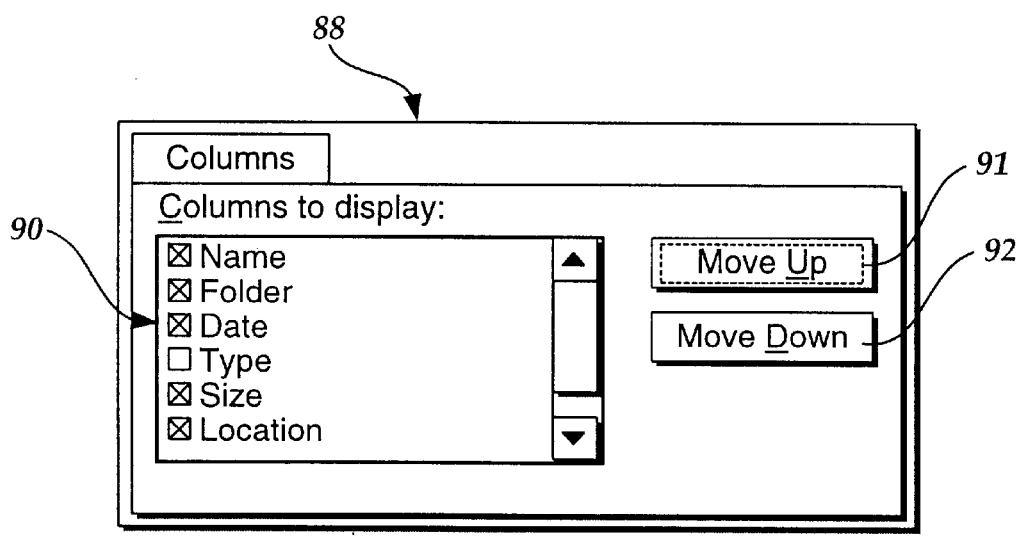
FIG. 2H illustrates an exemplary user interface for configuring the display of the notes index window of FIG. 2G.

A notes index window 80, such as the one illustrated in FIG. 2G displays summary information about notes. A Folder field 82 displays the name of the active project, or<none> if there is no active project. If a project is selected, a notes summary window 86 displays information for all of the notes associated with the specified project, and filtered by the note type (69 in FIG. 2D). A column header line 84 enumerating each summary information field is displayed above the notes summary window 86. If a project is not selected, (i.e., no active project), the notes summary window shows summary information for all of the notes including: the note name, associated project, date, size and memory location. Preferably, the user can sort the order of the notes, but cannot change or delete the order of the columns. In alternate embodiments, the user can change the order of and/or delete columns. In a preferred embodiment of the invention, the user can also specify the size of the columns. Preferably, the user can also sort the notes on any column in either ascending or descending order, for example, by selecting the desired field in the column header line 84. FIG. 2H illustrates an exemplary user interface for selecting and ordering the columns 88 to display in the notes index window 86. All of the available summary information fields (i.e., columns) are displayed in a Columns to display list 90. The user selects the columns to be displayed, e.g., by checking a box next to the columns to display. The order of the columns can be changed by selecting a column, and pressing a Move Up button 91 or a Move Down button 92.

Figure 2I:
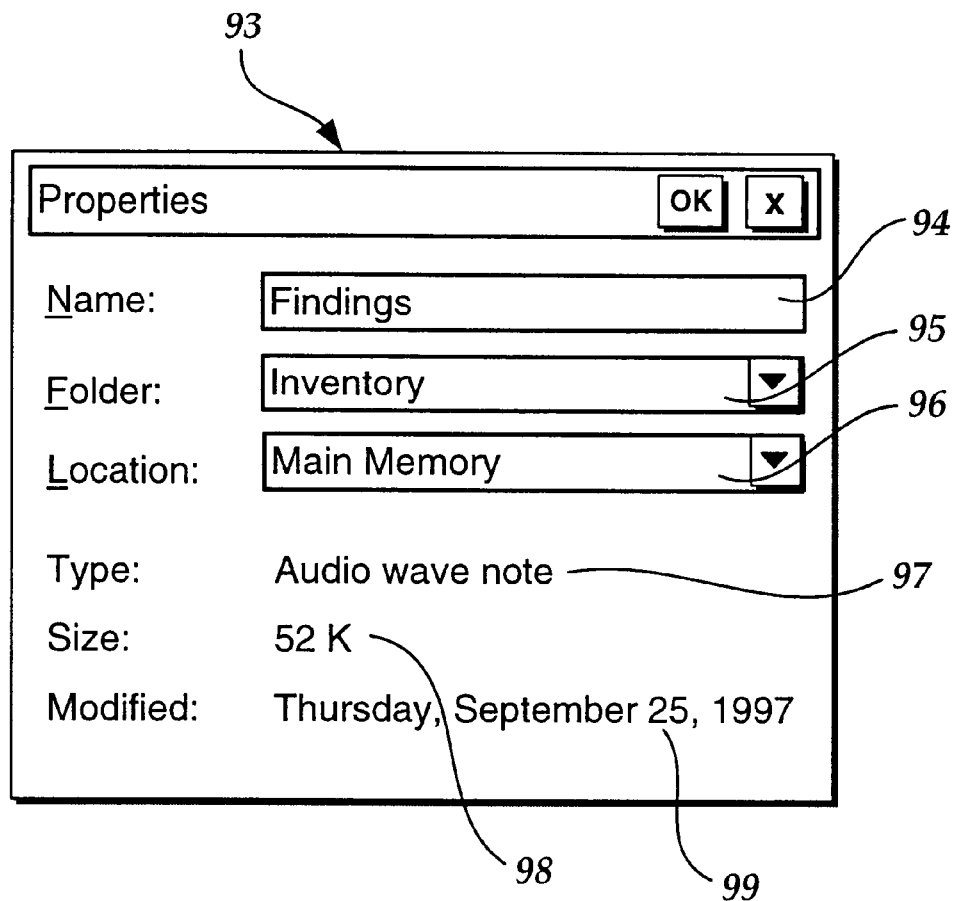
FIG. 2I illustrates an exemplary user interface for modifying the properties of a note.

In a preferred embodiment, the user can select one or more notes in the notes index window (86 of FIG. 2G). Preferably, the notes can be from different projects and/or removable file systems (e.g., main memory or compact Flash). The user can then perform one or more operations on the note or notes, e.g., edit the note, or modify the note properties. Note properties can be modified via a user interface such as the one illustrated in FIG. 2I. The note properties user interface 93 displays the current properties of a note and allows the user to modify some of the note properties. The note name can be changed by entering a new note name in a Name box 94. The note can be associated with a different project by selecting a project from a Folder list 95. The note may be moved to a new location by selecting a location from the Location list 96. The note properties user interface also displays non-modifiable note properties including: Type 97; Size 98; and time Modified 99.

Figure 3:
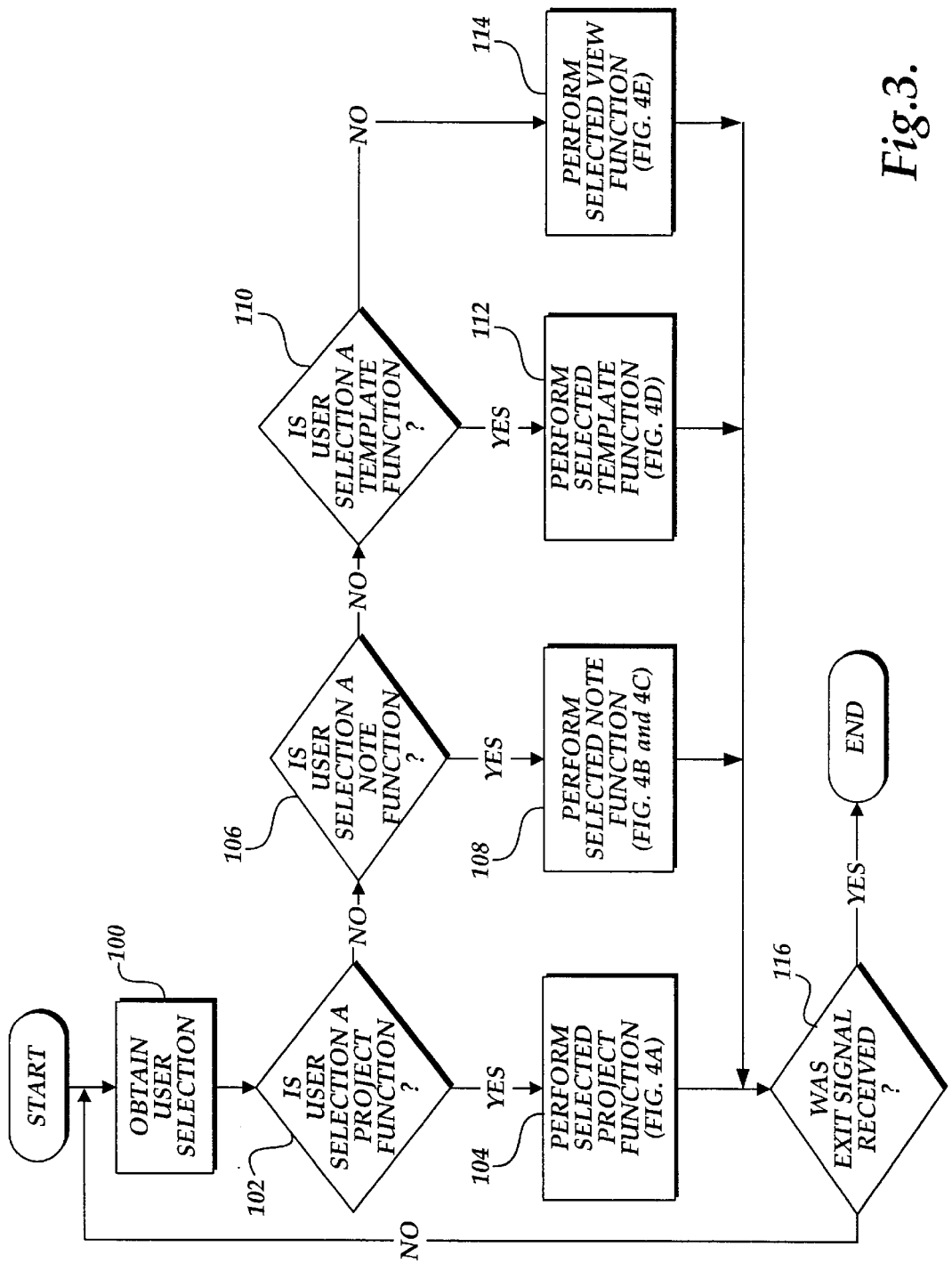
FIG. 3 is a flow diagram illustrating the overall logic used to organize notes in accordance with the present invention.

FIG. 3 illustrates a flow diagram of the overall logic used to organize notes in accordance with the present invention. The logic moves from a start block to a block 100 where a user selection is obtained. After the user selection is obtained, the specified user selection is performed. For ease of understanding, user functions have been divided into four categories: project functions; note functions; template functions; and view functions. It will be appreciated that the steps of determining user function by category are for ease of understanding by the reader, and are preferably bypassed in an actual embodiment of the invention. After a user selection is obtained, the logic proceeds to a decision block 102 where a test is made to determine if the user selection is a project function. If the user selection is a project function the logic moves to a block 104 where the selected project function is performed.

Figure 4A:
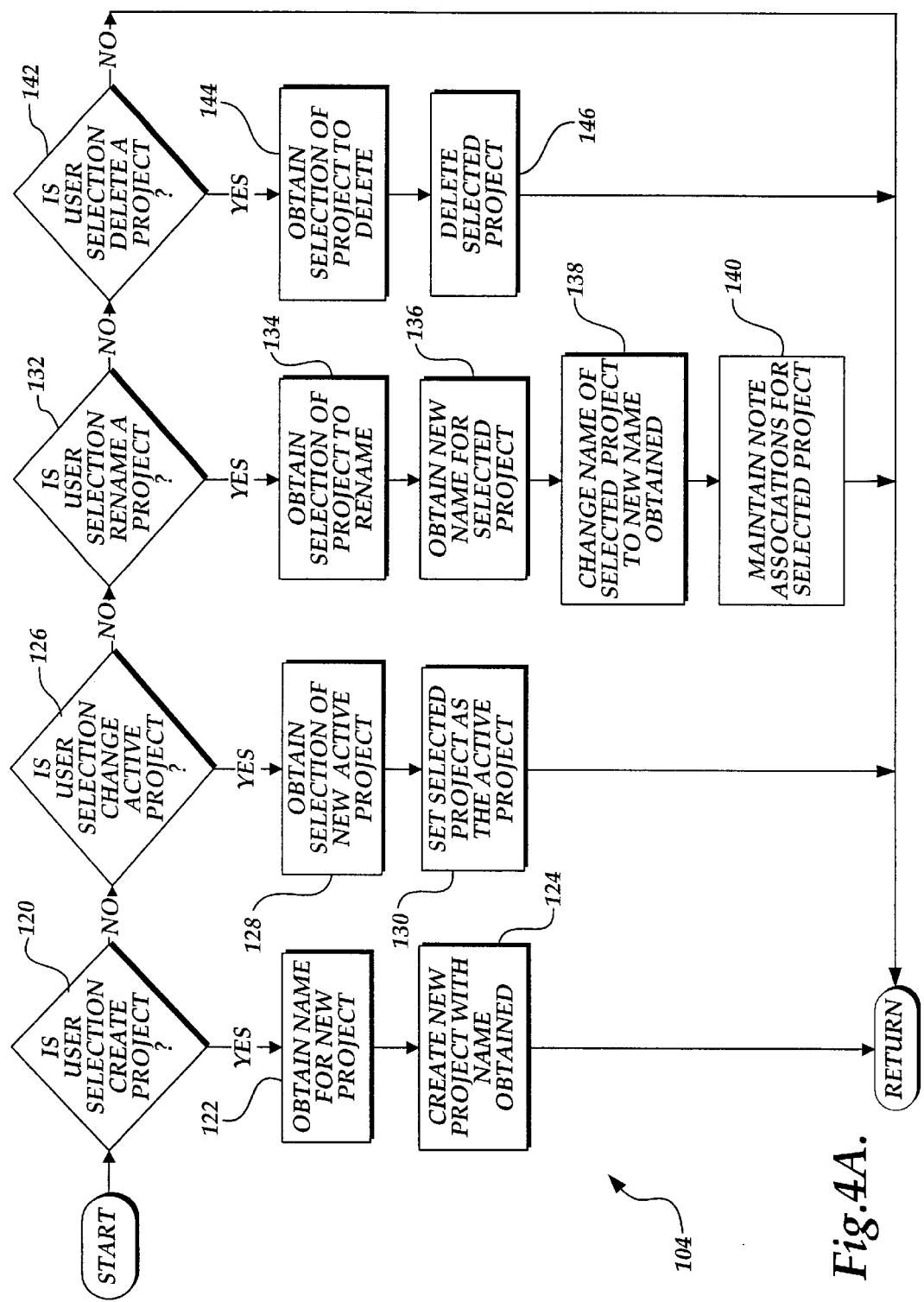
FIG. 4A is a flow diagram illustrating in detail the logic used to perform a project function.

The logic of performing a selected project function 104 is illustrated in detail in FIG. 4A. FIG. 4A illustrates exemplary project functions. It will be appreciated that other project functions can be included in actual embodiments of the invention, if desired. The logic of FIG. 4A moves from a start block to a decision block 120 where a test is made to determine if the user selection is to create a project. If the user selection is to create a project, the logic proceeds to a block 122 where a name for the new project is obtained, preferably from a user via a suitable user interface, such as the one shown in FIG. 2E. The logic then proceeds to a block 124 where a new project is created with the name obtained. The logic of performing the selected project function (i.e., creating a project) then ends and the process returns to FIG. 3.

If in decision block 120 it is determined that the user selection is not to create a project, the logic proceeds to a decision block 126 where a test is made to determine if the user selection is to change the active project. If the user selection is to change the active project, the logic moves to a block 128 where a selection of a new active project is obtained, preferably from the user via a suitable user interface containing a list of current projects. Preferably, the user can also select not to have an active project. The logic then moves to a block 130 where the selected project is set as the active project. The logic of performing the selected project function (i.e., changing the active project) then ends and the process returns to FIG. 3.

If in decision block 126 it is determined that the user selection is not to change the active project, the logic proceeds to a decision block 132 where a test is made to determine if the user selection is to rename a project. If the user selection is to rename a project, the logic proceeds to a block 134 where the selection of the project to rename is obtained, preferably from the user via a suitable user interface including a list of projects, such as the one shown in FIG. 2E. The logic then moves to a block 136 where a new name for the selected project is obtained, preferably from the user via a suitable user interface. The name of the selected project is then changed to the new name obtained, in a block 138. The logic then moves to a block 140 where note associations are maintained for the selected project. All notes associated with the project will still be associated with the renamed project. The note names will not be changed. The logic for performing the selected project function (i.e., renaming a project) then ends and the process returns to FIG. 3.

If in decision block 132 it is determined that the user selection is not to rename a project, the logic proceeds to a decision block 142 where a test is made to determine if the user selection is to delete a project. If the user selection is to delete a project, the logic moves to a block 144 where a selection of projects to delete is obtained, preferably from the user via a suitable user interface containing a list of projects, such as the one shown in FIG. 2E. The logic then proceeds to a block 146 where the selected project is deleted. The logic for performing a selected project function (i.e., deleting a project) then ends and the process returns to FIG. 3. Likewise, if in decision block 142 it is determined that the user selection is not to delete a project, the logic for performing the selected project function ends and the process returns to FIG. 3.

Returning to FIG. 3, if in decision block 102 it is determined that the user selection is not a project function, the logic proceeds to a decision block 106 where a test is made to determine if the user selection is a note function. If the user selection is a note function, the logic proceeds to a block 108 where the selected note function is performed.

Figure 4B:
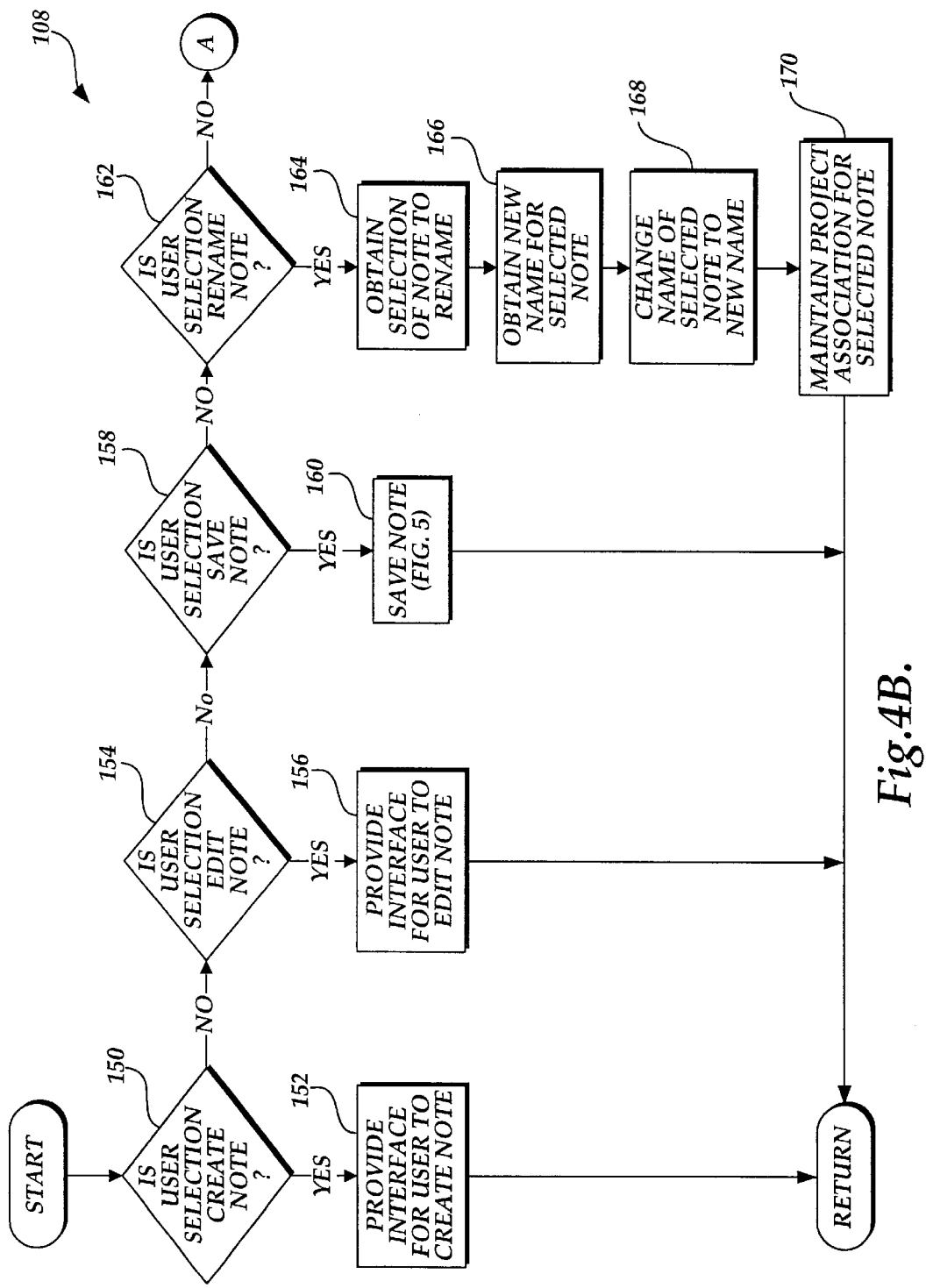
FIGS. 4B and 4C are flow diagrams illustrating in detail the logic used to perform a note function.
Figure 4C:
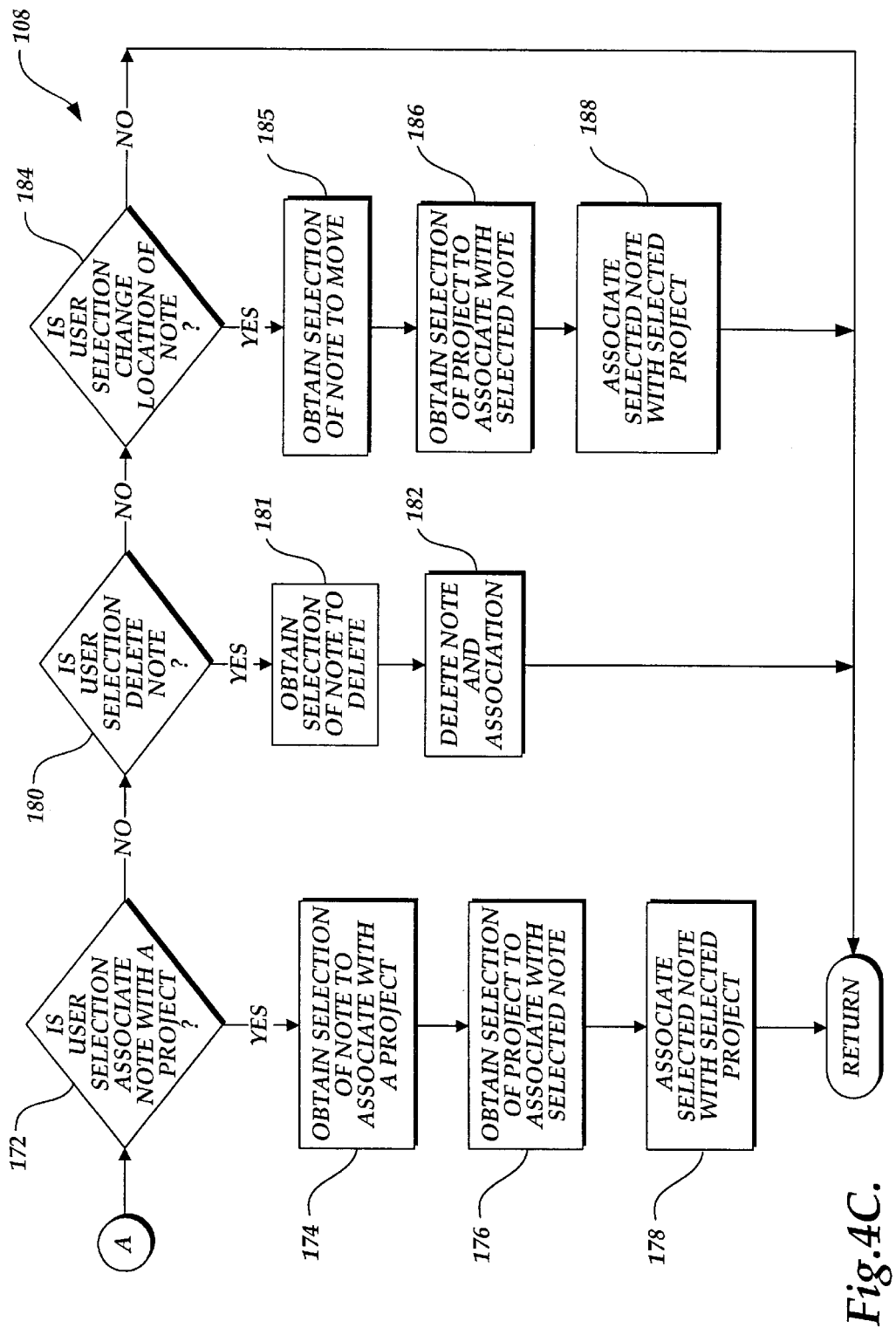

The logic of performing a selected note function 108 is illustrated in detail in FIGS. 4B and 4C. FIGS. 4B and 4C illustrate exemplary note functions. It will be appreciated that other note functions can be included in other embodiments of the invention, if desired. It will also be appreciated that note functions apply to any type of note (e.g., voice note, ink note, etc.). The logic of FIG. 4B moves from a start block to a decision block 150 where a test is made to determine if the user selection is to create a note. If the user selection is to create a note, the logic proceeds to a block 152 where a user interface, such as the one shown in FIG. 2A, or the one shown in FIG. 2B, is provided for creating a note. The logic of performing the selected note function (i.e., creating a note) then ends and the process returns to FIG. 3.

If in decision block 150 it is determined that the user selection is not to create a note, the logic proceeds to a decision block 154 where a test is made to determine if the user selection is to edit a note. If the user selection is to edit a note, the logic proceeds to a block 156 where a user interface is provided for editing a note. The logic of performing the selected note function (i.e., editing the note) then ends and the process returns to FIG. 3.

If in decision block 154 it is determined that the user selection is not to edit a note, the logic proceeds to a decision block 158 where a test is made to determine if the user selection is to save a note. If the user selection is to save a note, the logic proceeds to a block 160 where the note is saved.

Figure 5:
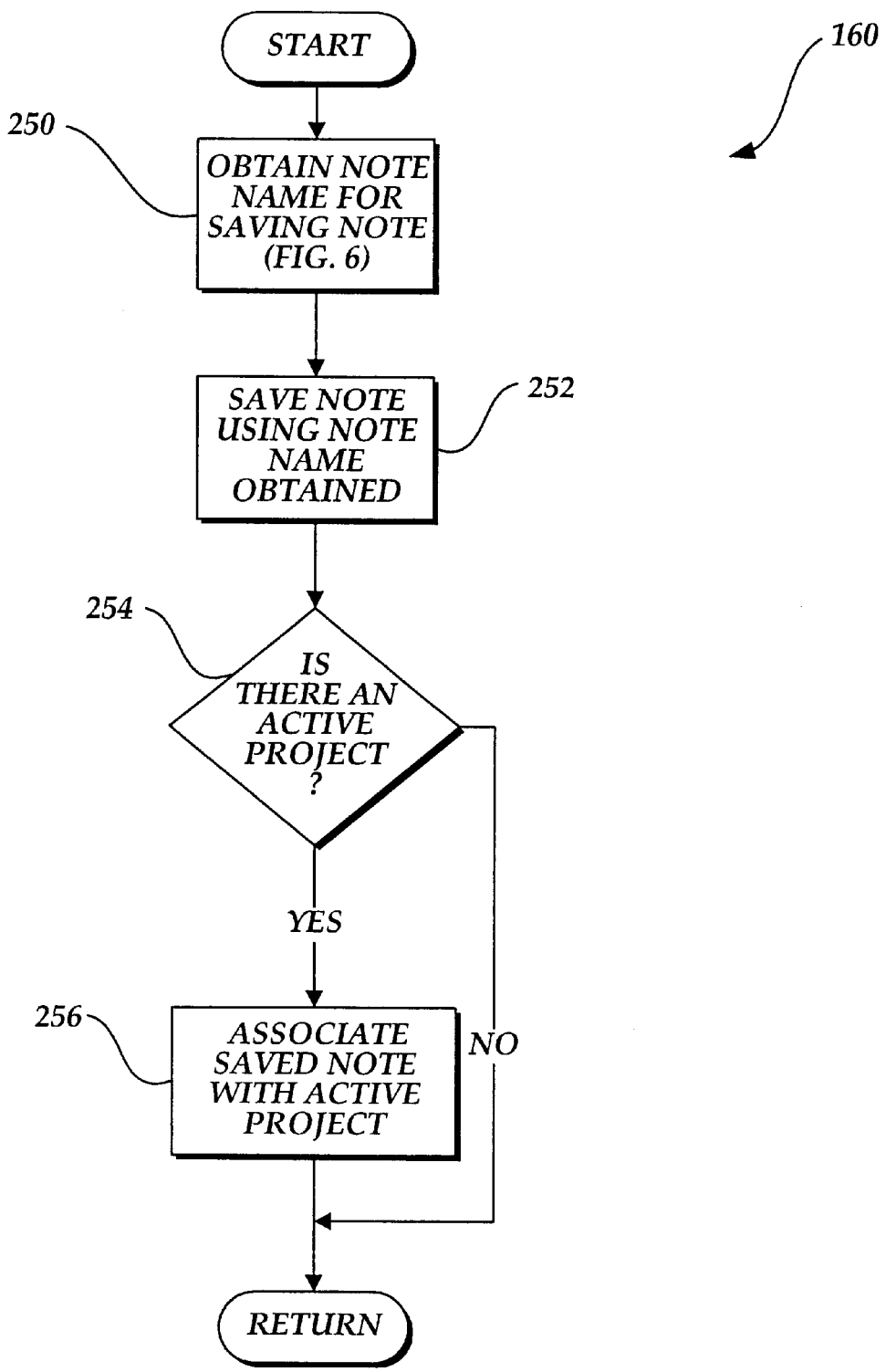
FIG. 5 is a flow diagram illustrating in detail the logic used to save a note.
Figure 6:
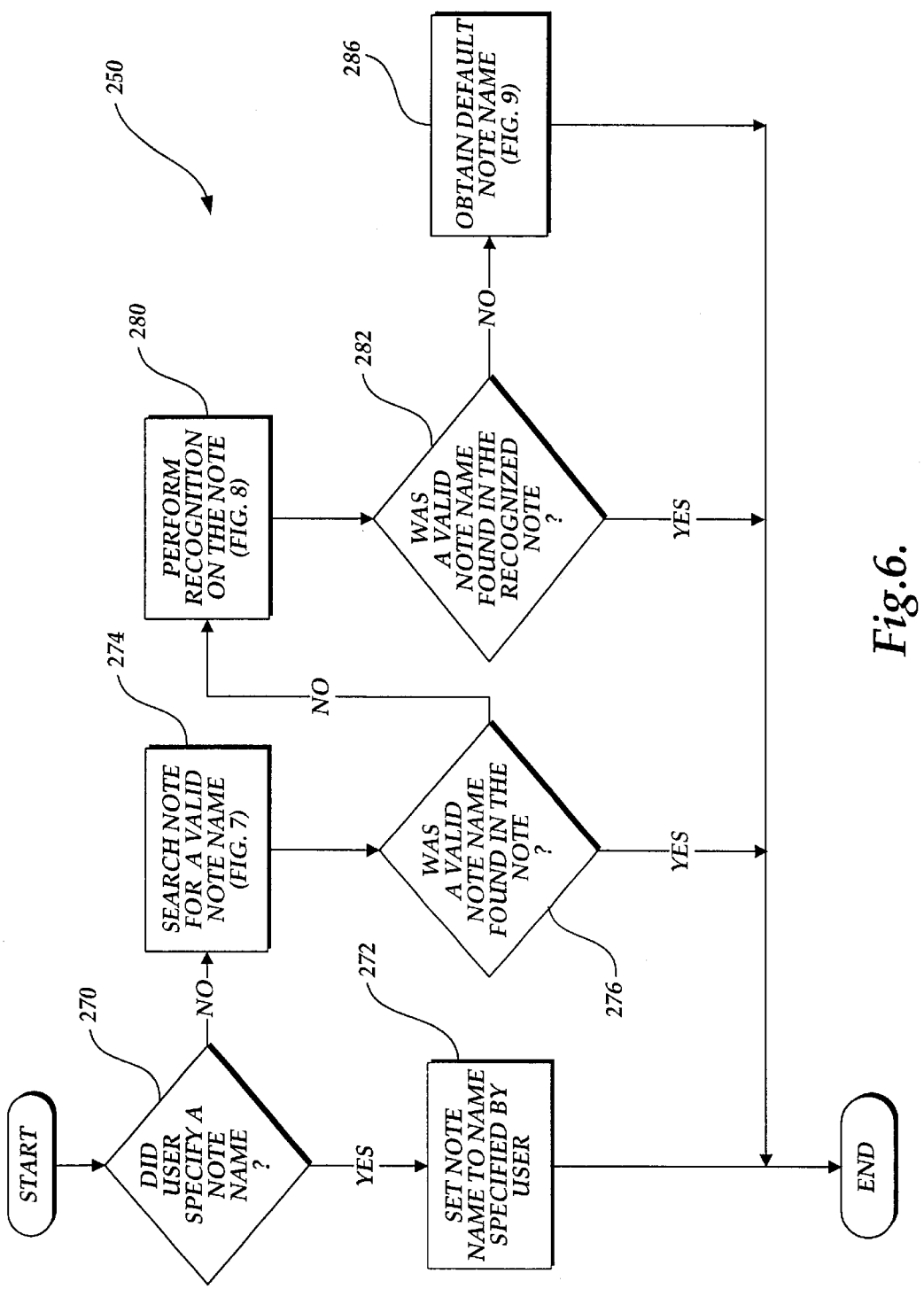
FIG. 6 is a flow diagram illustrating in detail the logic used to obtain a name for saving a note.

The logic of saving a note 160 is illustrated in detail in FIG. 5. Preferably, the user selection to save a note is available from the user interface provided when the user selects to create or edit a note. An exemplary save user interface that is displayed when a user selects the function of saving a note is illustrated in FIG. 2C. The logic of FIG. 5 moves from a start block to a block 250 where a note name for saving the note is obtained. The logic for obtaining the note name for saving the note 250 is illustrated in detail in FIG. 6. The logic of FIG. 6 moves from a start block to a decision block 270 where a test is made to determine if the user specified a note name. If the user specified a note name, the logic moves to a block 272 where the note name is set to the name specified by the user. The logic of obtaining a note name for saving the note (i.e., a user specified note name) then ends and the process returns to FIG. 5. If the user did not specify a note name, the logic moves to a block 274 where the note is searched for a valid note name.

Figure 7:
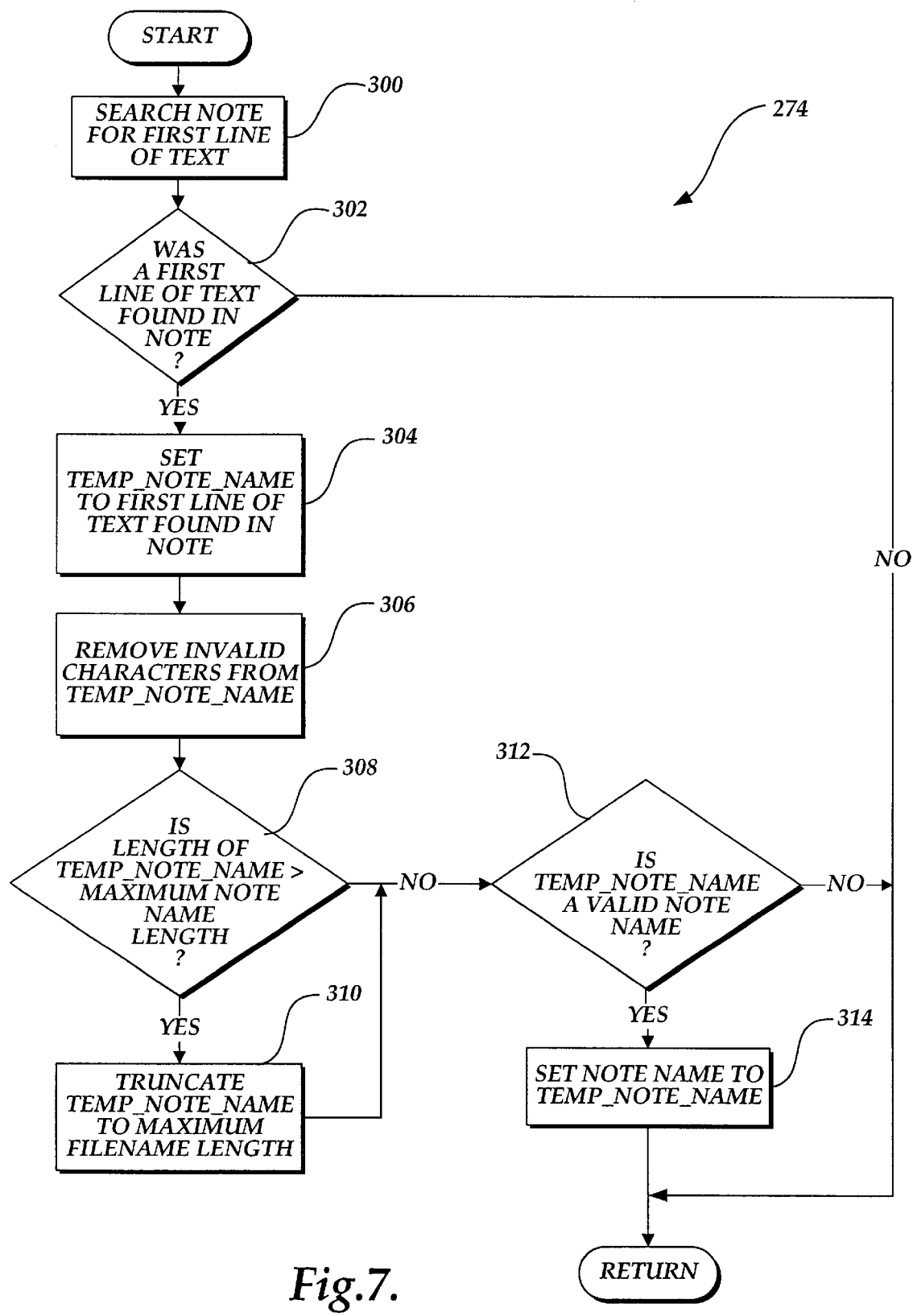
FIG. 7 is a flow diagram illustrating in detail the logic used to search a note for a valid note name.

The logic of searching a note for a valid note name 274 is illustrated in detail in FIG. 7. The logic of FIG. 7 moves from a start block to a block 300 where the note is searched for a first line of text. The logic then moves to a decision block 302 where a test is made to determine if a first line of text was found in the note. If a first line of text was not found in the note, the logic of searching a note for a valid note name ends and the process returns to FIG. 6. If, however, a first line of text was found in the note, the logic proceeds to a block 304 where Temp_Note_Name is set to the first line of text found in the note. Invalid characters are removed from Temp_Note_Name, in a block 306. Preferably, invalid characters are invalid filename characters (e.g., "/", etc.) for the operating system 28 of computing system 20 on which the invention is implemented. The logic then proceeds to a decision block 308 where a test is made to determine if the length of Temp_Note_Name exceeds a maximum note name length (e.g., the maximum file name length for the operating system 28 of computing system 20 on which the invention is implemented). If the length of Temp_Note_Name exceeds the maximum note name length, the logic proceeds to a block 310 where Temp_Note_Name is truncated to the maximum note name length. Regardless of whether it is determined in decision block 308 that the length of Temp_Note_Name exceeds the maximum note name length, the logic proceeds to a decision block 312 where a test is made to determine if Temp_Note_Name is a valid note name. If Temp_Note_Name is a valid note name, the logic proceeds to a block 314 where the note name is set to Temp_Note_Name. Regardless of whether Temp_Note_Name is a valid note name, the logic of searching a note for a valid note name then ends and the process returns to FIG. 6.

Returning to FIG. 6, after searching the note for a valid note name 274, the logic proceeds to a decision block 276 where a test is made to determine if a valid note name was found in the note. If a valid note name was found in the note, the note name was set to the valid note name in block 314 of FIG. 6, and the logic of obtaining a note name for saving the note ends and the process returns to FIG. 5. If a valid note name was not found in the note, the logic proceeds to a block 280 where recognition is performed on the note.

Figure 8:
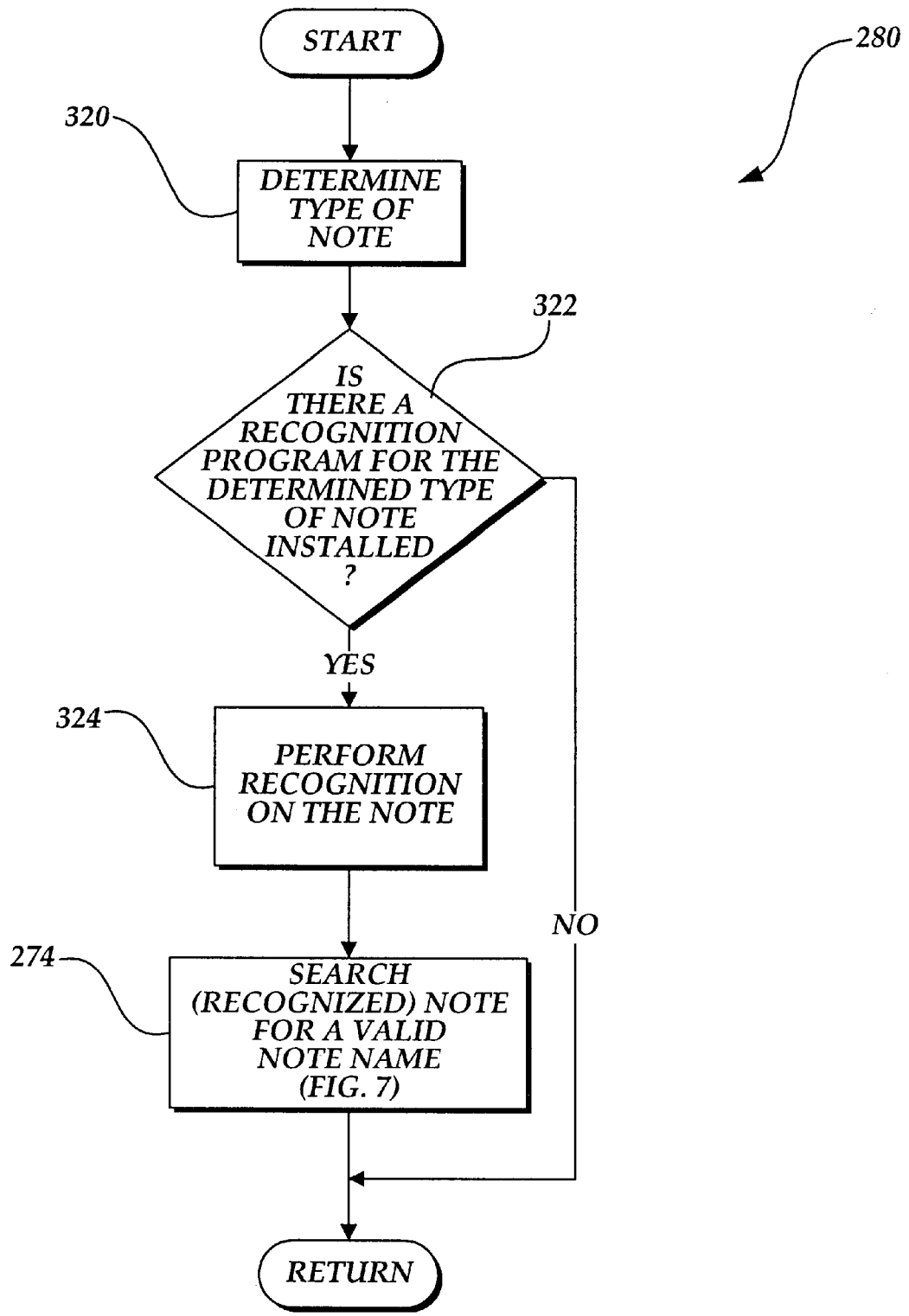
FIG. 8 is a flow diagram illustrating in detail the logic used to perform recognition on a note.

The logic of performing recognition on the note 280 is illustrated in detail in FIG. 8. The logic of FIG. 8 moves from a start block to a block 320 where the type of note, (e.g., voice, ink, etc.) is determined. The logic then proceeds to a decision block 322 where a test is made to determine if there is a recognition program installed for the determined note type. If an appropriate recognition program is not installed, recognition cannot be performed on the note, and the logic for performing recognition on a note ends in a block. If, on the other hand, there is a recognition program installed for the determined note type, the logic proceeds to a block 324 where recognition is performed on the note (e.g., speech recognition is performed on a voice note). After recognition is performed on the note, the logic proceeds to block 274 where the recognized note is searched for a valid note name. The logic of searching a note for a valid note name is illustrated in detail in FIG. 7, and described above. The logic of performing recognition then ends and the process returns to FIG. 6.

Returning to FIG. 6, after performing recognition on the note 280, the logic proceeds to a decision block 282 where a test is made to determine if a valid note name was found in the recognized note. If a valid note name was found in the recognized note, the note name was set to the valid note name found in the recognized note in block 314 of FIG. 7, and the logic of obtaining a note name for saving the note ends and the process returns to FIG. 5. If a valid note name was not found in the recognized note, the logic proceeds to a block 286 where a default note name is obtained.

Figure 9:
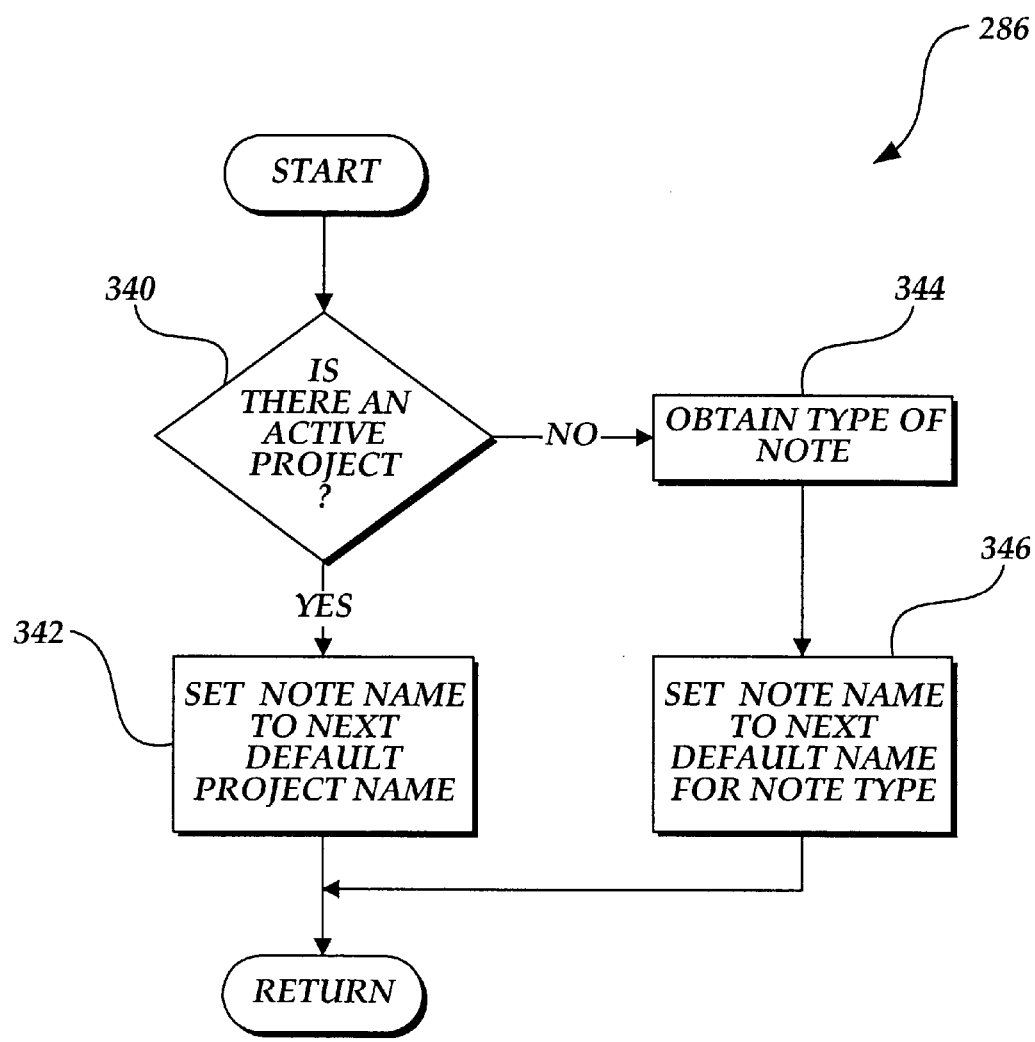
FIG. 9 is a flow diagram illustrating in detail the logic used to obtain a default note name.

The logic of obtaining a default note name 286 is illustrated in detail in FIG. 9. The logic of FIG. 9 moves from a start block to a decision block 340 where a test is made to determine if there is an active project. If there is an active project, the logic proceeds to a block 342 where the note name is set to the next default project name (e.g., PROJX1, PROJX2, etc.). If there is not an active project, the logic proceeds to a block 344 where the type of note is obtained. The logic then proceeds to a block 346 where the note name is set to the next default name for the note type (e.g. VOICE1, VOICE2, etc.). After the note name is set to the appropriate default note name, the logic of obtaining a default note name ends and the process returns to FIG. 6.

Returning to FIG. 6, after the note name has been set to a default note name 286, the logic of obtaining a name for saving a note ends and the process returns to FIG. 5.

Returning to FIG. 5, after obtaining the note name for saving a note 250, the logic proceeds to a block 252 where the note is saved using the note name obtained. The logic then proceeds to a decision block 254 where a test is made to determine if there is an active project. If there is an active project, the logic proceeds to a block 256 where the saved note is associated with the active project. If there is not an active project, the saved note is not initially associated with any project. (i.e., it is stored in the top, or projects, directory). Regardless of whether there is an active project, the logic of saving a note then ends and the process returns to FIG. 4B.

Returning to FIG. 4B, after the logic of performing the selected note function (i.e., saving a note) ends and the process returns to FIG. 3. Alternatively, if in decision block 158 it is determined that the user selection is not to save a note, the logic proceeds to a decision block 162 where a test is made to determine if the user selection is to rename a note. If the user selection is to rename a note, the logic proceeds to a block 164 where a selection of a note to rename is obtained, preferably from the user via a suitable user interface, such as the one shown in FIG. 2I. The logic then proceeds to a block 166 where a new name for the selected note is obtained, preferably from a user interface. The logic then moves to a block 168 where the name of the selected note is changed to the new name. The logic then moves to a block 170 where project associations for the selected note are maintained. The note will be associated with the same project, if any, as prior to the renaming of the note. The logic of performing the selected note function (i.e., renaming a note) then ends and the process returns to FIG. 3.

If in decision block 162 it is determined that the user selection is not to rename a note, the logic proceeds to a decision block 172 (FIG. 4C) where a test is made to determine if the user selection is to associate a note with a project. If the user selection is to associate a note with a project, the logic proceeds to a block 174 where the selection of a note to associate with a project is obtained, preferably by the user via a suitable user interface. The logic then moves to a block 176 where the selection of a project to associate with the. selected note is obtained, preferably by the user via a suitable user interface, such as the one shown in FIG. 2I. The logic then moves to a block 178 where the selected note is associated with the selected project. The logic of performing a note function (i.e., associating a note with a project), then ends and the process returns to FIG. 3.

If in a decision block 172 it is determined that the user selection is not to associate a note with a project, the logic proceeds to a decision block 180 where a test is made to determine if the user selection is to delete a note. If the user selection is to delete a note, the logic moves to a block 181 where a selection of a note to delete is obtained, preferably from the user. The logic then proceeds to a block 182 where the selected note, and project association, if there is one, are deleted. The logic of performing the selected note function (i.e., deleting a note) then ends and the process returns to FIG. 3.

If in a decision block 180 it is determined that the user selection is not to delete a note, the logic proceeds to a decision block 184 where a test is made to determine if the user selection is to change the location of a note. If the user selection is to change the location of a note, the logic moves to a block 185 where a selection of a note to move is obtained, preferably from the user. The logic then moves to a block 186 where a location to move the note is obtained, preferably via a suitable user interface, such as the one shown in FIG. 2I. The logic then proceeds to a block 188 where the selected note is moved to the specified location. The logic of performing the selected note function (i.e., changing the location of a note) then ends and the process returns to FIG. 3. Alternatively, if in decision block 184 it is determined that the user selection is not to change the location of the note, the process returns to FIG. 3.

Returning to FIG. 3, if in decision block 106 it is determined that the user selection is not a note function, the logic proceeds to a decision block 110 where a test is made to determine if the user selection is a template function. If the user selection is a template function, the logic proceeds to a block 112 where the selected template function is performed.

The logic of performing a selected template function 112 is illustrated in detail in FIG. 4D. The logic of FIG. 4D moves from a start block to a decision block 190 where a test is made to determine if the user selection is to create a template. If the user selection is to create a template, the logic proceeds to a block 192 where a user interface is provided for creating a template. The logic of performing the selected template function (i.e., creating a template) then ends and the process returns to FIG. 3.

If the user selection is not to create a template, the logic proceeds to a decision block 194 where a test is made to determine if the user selection is to edit a template. If the user selection is to edit a template, the logic proceeds to a block 196 where a selection of a template is obtained from the templates project. The logic then proceeds to a block 198 where a user interface is provided to edit the selected template. The logic of performing the selected template function (i.e., edit a template) then ends and the process returns to FIG. 3.

If in decision block 194 it is determined that the user selection is not to edit a template, the logic proceeds to a decision block 200 where a test is made to determine if the user selection is to save a template. If the user selection is to save a template, the logic proceeds to a block 202 where a name for saving the template is obtained, preferably by the user via a suitable user interface. The logic then proceeds to a block 204 where the template is saved using the name obtained. The logic then moves to a block 206 where the saved template is associated with the templates project. The logic of performing the selected template function (i.e., save a template) then ends and the process returns to FIG. 3.

If in decision block 200 it is determined that the user selection is not to save a template, the logic proceeds to a decision block 208 where a test is made to determine if the user selection is to create a note from a template. If the user selection is to create a note from a template, the logic proceeds to a block 210 where the selection of a template is obtained from the templates project. The logic then moves to a block 212 where a user interface is provided for creating a note based on the selected template. When the note is saved, it will be associated with the active project, if there is an active project. The logic of performing the selected template function (i.e., create a note from a template) ends and the process returns to FIG. 3. Likewise, if in decision block 208 it is determined that the user selection is not to create a note from a template, the logic for performing the selected template function ends and the process returns to FIG. 3.

Figure 4E:
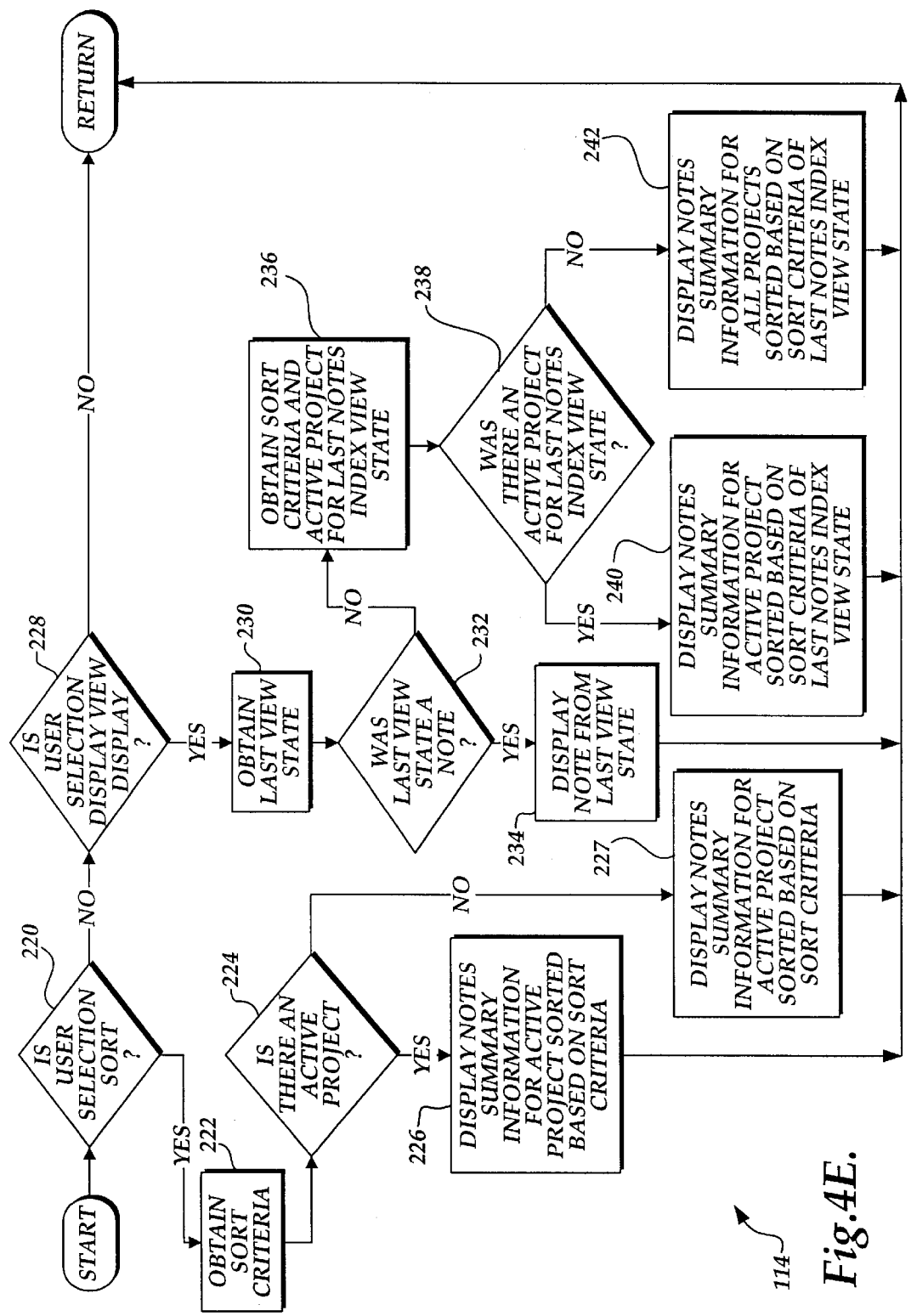
FIG. 4E is a flow diagram illustrating in detail the logic used to perform a view function.
Figure 4E:
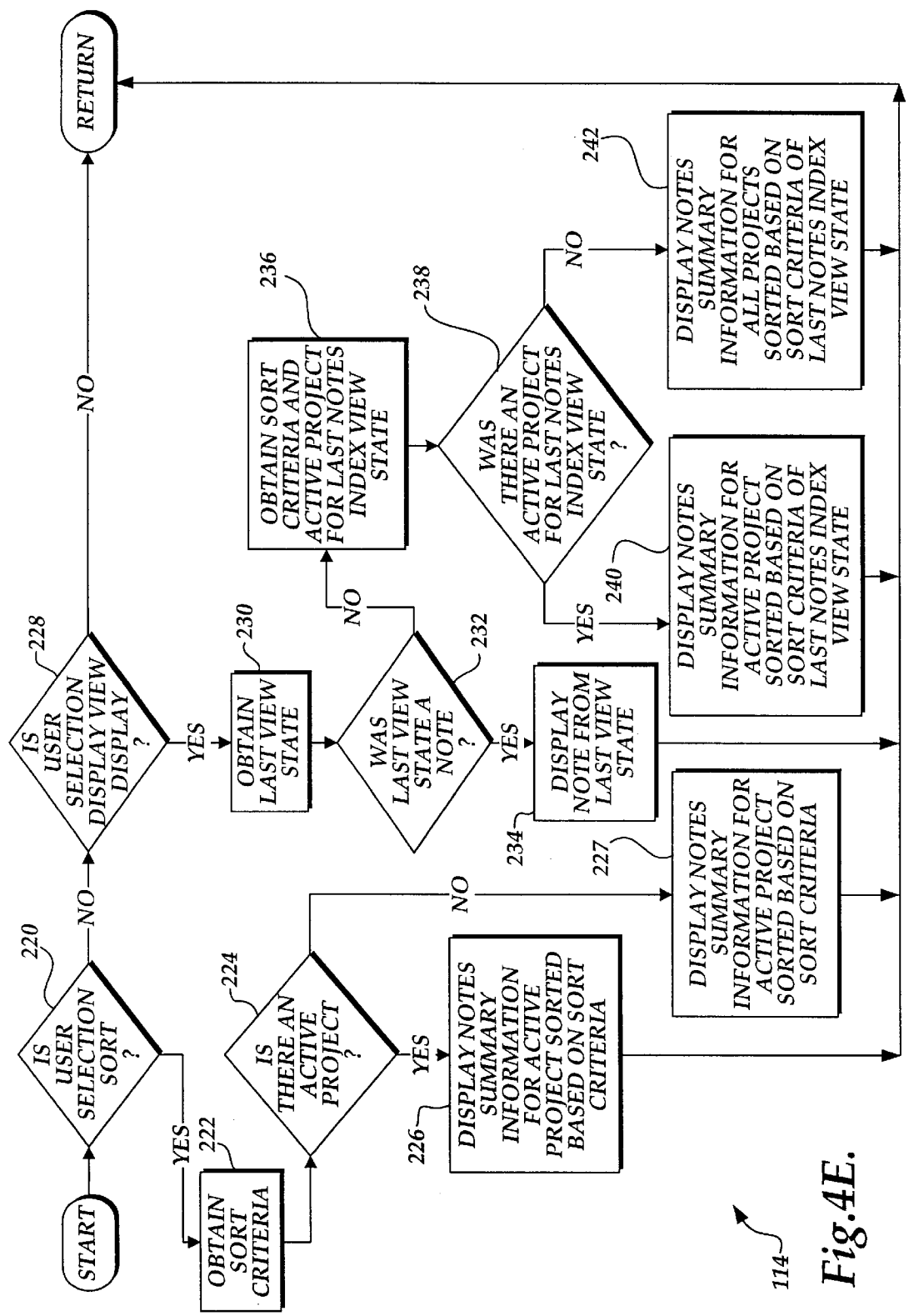

Returning to FIG. 3, if in decision block 110 it is determined that the user selection is not a template function, the logic proceeds to a block 114 where the selected view function is performed. The logic of performing a selected view function 114 is illustrated in detail in FIG. 4E. The logic of FIG. 4E moves from a start block to a decision block 220 where a test is made to determine if the user selection is to sort. If the user selection is to sort, the logic proceeds to a block 222 where sort criteria for the notes index summary information, e.g., 86 in FIG. 2G, is obtained, preferably from the user, for example via a user interface such as the one shown in FIG. 2H. The logic then proceeds to a decision block 224 where a test is made to determine if there is an active project. If there is an active project, summary information for all notes associated with the active project is displayed in sorted order based on the sort criteria, in a block 226. If there is not an active project, summary information for all notes is displayed in sorted order based on the sort criteria, in a block 227. Preferably, sorting criteria can be in ascending or descending order, of any data in the summary information displayed in the notes index display, including the note name, associated project, (if any), note type, memory location (e.g., main memory or storage card memory), note size and note time. After the summary information is displayed in sorted order, either for the active project 226, or for all projects 223, the logic of performing the selected view function (i.e., sorting) ends and the process returns to FIG. 3.

If in decision block 220 it is determined that the user selection is not to sort, the logic proceeds to a decision block 228 where a test is made to determine if the user selection is to display the view display. The view state is the last known state. This enables the user to perform another task, and then return to organizing notes where he or she left off. If the user selection is to display the view display, the logic proceeds to a block 230 where the last view state is obtained. The logic then proceeds to a decision block 232 where a test is made to determine if the last view state was a note. If the last view state was a note, the logic proceeds to a block 234 where the note from the last view state is displayed. The logic of performing the selected view function (i.e., display view state where last view state is a note) then ends and the process returns to FIG. 3.

If the last view state was not a note, it was a notes index window, and the logic moves to a block 236 where sort criteria and the active project for the last notes index view state are obtained. The logic then proceeds to a decision block 238 where a test is made to determine if there was an active project for the last notes index view state. If there was an active project for the last notes index view state, the logic proceeds to a block 240 where summary information about notes for the active project of the last notes index view state are displayed in sorted order based on the sort criteria of the last view state. If there was not an active project for the last notes index view state, the logic proceeds to a block 242 where notes for all projects of the last notes index view state are displayed in sorted order based on the sort criteria of the last view state. After performing the specified user selection, the logic for performing a selected view function (i.e., display notes index window with summary information) ends and the process returns to FIG. 3. Alternatively, if in decision block 228 it is determined that the user selection is not to display the view display, the logic for performing the selected view function ends and the process returns to FIG. 3.

Returning to FIG. 3, after the selected user function has been performed (i.e., selected project function, note function, template function, or view function), the logic proceeds to a decision block 116 where a test is made to determine if an exit signal has been received. If an exit signal has not been received, the logic returns to block 100 where a new user selection is obtained and processed. User selections are obtained and processed repeatedly until an exit signal is received. If in decision block 116 it is determined that an exit signal has been received, the logic of organizing notes, ends.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method for organizing notes on a limited resource computing device comprising:
   (a) providing an interface for a user to create a note;
   (b) in response to a user requesting saving the note, storing the note;

(c) automatically determining if there is an active project, wherein there is not more than one active project at the same time; and (d) if there is an active project, automatically associating the note with the active project.

2. The method of claim 1, further comprising, in response to the user specifying a project name, creating the specified project.

3. The method of claim 2, further comprising, in response to a user specifying a project location, creating the project at the specified location.

4. The method of claim 1, further comprising, in response to a user designating a project as active, setting the active project to the project designated by the user.

5. The method of claim 1, wherein storing the note comprises determining a note name.

6. The method of claim 5, wherein the note name is specified by the user.

7. The method of claim 5, wherein the note name is determined based on a first line of text in the note.

8. The method of claim 7, wherein determining the note name from the first line of text comprises:

(a) searching the note for the first line of text; and (b) if the first line of text is found in the note:
  (i) removing any invalid characters from the first line of text;
  (ii) truncating the first line of text if it exceeds a maximum note name length; and
  (iii) verifying that the first line of text is a valid note name.

9. The method of claim 8, further comprising performing recognition to determine the first line of text.

10. The method of claim 5, wherein the note name is a default note name.

11. The method of claim 10, wherein determining the default note name comprises:

(a) determining if there is an active project;

(b) if there is an active project, setting the note name to the next project default note name; and (c) if there is not an active project, setting the note name to the next non-project default note name.

12. The method of claim 11, wherein setting the note name to the next non-project default note name further comprises:

(a) determining a note type; and (b) setting the note name to the next default for the note type.

13. The method of claim 1, wherein a user requesting saving the note comprises the user specifying a note location, and storing the note comprises storing the note at the specified location.

14. The method of claim 1, wherein providing an interface for a user to create a note comprises providing an interface for a user to create a note from a template.

15. The method of claim 1, further comprising:

(a) in response to a user requesting a notes index window display, determining if there is an active project;

(b) if there is an active project, displaying a note name and associated summary information for each of the notes associated with the active project; and (c) if there is not an active project, displaying a note name and associated summary information for each of the notes for all projects.

16. The method of claim 15, further comprising, in response to a user requesting sorting, displaying the note name and associated note data for each of the notes in sorted order.

17. An apparatus for organizing notes on a limited resource computing device, comprising:

(a) a processing unit; and (b) a storage medium coupled to the processing unit, the storage medium storing program code implemented by the processing unit for:
  (i) providing an interface for a user to create a note;
  (ii) in response to a user requesting saving the note, storing the note;
  (iii) automatically determining if there is an active project, wherein there is not more than one active project at the same time; and
  (iv) if there is an active project, automatically associating the note with the active project.

18. The apparatus of claim 17, wherein the program code implemented by the processing unit further creates a specified project, in response to the user specifying a project name.

19. The apparatus of claim 18, wherein the project created is created at a location specified by the user.

20. The apparatus of claim 17, wherein the program code implemented by the processing unit further sets a project as active in response to a user designating the project as active.

21. The apparatus of claim 17, wherein storing the note comprises determining a note name.

22. The apparatus of claim 21, wherein the note name is specified by the user.

23. The apparatus of claim 21, wherein the note name is determined based on a first line of text in the note.

24. The apparatus of claim 23, wherein the program code implemented by the processing unit determines the note name from the first line of text by:

(a) searching the note for the first line of text; and (b) if the first line of text is found in the note:
  (i) removing any invalid characters from the first line of text;
  (ii) truncating the first line of text if it exceeds a maximum note name length; and
  (iii) verifying that the first line of text is a valid note name.

25. The apparatus of claim 24, wherein the program code implemented by the processing unit, further performs recognition to determine the first line of text.

26. The apparatus of claim 21, wherein the note name is a default note name.

27. The apparatus of claim 26, wherein the program code implemented by the processing unit, determines the default note name by:

(a) determining if there is an active project;

(b) if there is an active project, setting the note name to the next project default note name; and (c) if there is not an active project, setting the note name to the next non-project default note name.

28. The apparatus of claim 27, wherein the program code implemented by the processing unit sets the note name to the next non-project default note name by:

(a) determining a note type; and (b) setting the note name to the next default for the note type.

29. The apparatus of claim 17, wherein providing an interface for a user to create a note comprises providing an interface for a user to create a note from a template.

30. The apparatus of claim 17, further comprising:

(i) in response to a user requesting a notes index window display, determining if there is an active project;

(ii) if there is an active project, displaying a note name and associated summary information for each of the notes associated with the active project; and (iii) if there is not an active project, displaying a note name and associated summary information for each of the notes for all projects.

31. The apparatus of claim 30, wherein the program code implemented by the processing unit displays the note name and associated note data for each of the notes in sorted order, in response to a user requesting sorting.

* * * * *

UNITED STATES PATENT AND TRADEMARK OFFICE
CERTIFICATE OF CORRECTION

PATENT NO. : 6,487,569 B1
DATED : November 26, 2002
INVENTOR(S) : C.E. Lui et al.

It is certified that error appears in the above-identified patent and that said Letters Patent is hereby corrected as shown below:

Column 1,
Line 53, "method, and system" should read -- method and system --

Column 2,
Line 46, "not user interface" should read -- notes user interface --

Column 3,
Line 32, "example, mobile" should read -- example, in mobile --

Column 4,
Line 52, "organized, the structure also" should read -- organized, but the structure --

Column 5,
Line 27, "as well as main memory." should read -- as well as in main memory. --
Line 58, "2G displays" should read -- 2G, displays --
Line 66, "selected, (i.e., no" should read -- selected (i.e., no --
Line 67, "notes including:" should read -- notes, including --

Column 8,
Line 43, " (e.g., "/", " should read -- (e.g., "\", --

Column 9,
Line 60, "any project. (i.e.," should read -- any project (i.e., --
Line 65, "ends and the" should read -- ends, the --

Column 10,
Line 25, "the. selected" should read -- the selected --

UNITED STATES PATENT AND TRADEMARK OFFICE
CERTIFICATE OF CORRECTION

PATENT NO.   : 6,487,569 B1
DATED        : November 26, 2002
INVENTOR(S)  : C.E. Lui et al.

It is certified that error appears in the above-identified patent and that said Letters Patent is hereby corrected as shown below:

<u>Column 12,</u>
Line 55, "notes, ends." should read -- notes ends. --

<u>Column 14,</u>
Line 43, "unit, further" should read -- unit further --
Line 48, "unit, determines" should read -- unit determines --

Signed and Sealed this

Thirtieth Day of September, 2003

JAMES E. ROGAN
*Director of the United States Patent and Trademark Office*